United States Patent
Schucker

(10) Patent No.: US 7,112,246 B2
(45) Date of Patent: Sep. 26, 2006

(54) DEVICE FOR APPLYING ADHESIVE TO A WORKPIECE

(75) Inventor: Josef Schucker, Käthe-Kollwitz-Strasse 10a, D-76227 Karlsruhe (DE)

(73) Assignee: Josef Schucker, Karlsruhe (DE)

( * ) Notice: Subject to any disclaimer, the term of this patent is extended or adjusted under 35 U.S.C. 154(b) by 0 days.

(21) Appl. No.: 10/381,950

(22) PCT Filed: Aug. 2, 2001

(86) PCT No.: PCT/EP01/08965

§ 371 (c)(1), (2), (4) Date: Jun. 30, 2003

(87) PCT Pub. No.: WO02/26397

PCT Pub. Date: Apr. 4, 2002

(65) Prior Publication Data

US 2004/0011284 A1    Jan. 22, 2004

(30) Foreign Application Priority Data

Sep. 29, 2000 (DE) .............................. 100 48 749

(51) Int. Cl.
B05B 3/00 (2006.01)
B05C 11/00 (2006.01)
(52) U.S. Cl. .................... 118/688; 118/323; 118/713
(58) Field of Classification Search ............... 118/321, 118/323, 712, 713, 688
See application file for complete search history.

(56) References Cited

U.S. PATENT DOCUMENTS

| | | | | |
|---|---|---|---|---|
| 4,218,989 A | * | 8/1980 | Fujita et al. ................. | 118/713 |
| RE33,481 E | * | 12/1990 | Ziecker et al. ............... | 239/298 |
| 4,987,854 A | * | 1/1991 | Hall ........................... | 118/679 |
| 5,083,073 A | * | 1/1992 | Kato ........................... | 318/577 |
| 5,711,461 A | * | 1/1998 | Foster et al. ................ | 222/383.1 |
| 5,781,951 A | * | 7/1998 | Sergio et al. ................ | 12/142 F |
| 5,807,449 A | * | 9/1998 | Hooker et al. ............... | 156/64 |
| 5,968,297 A | * | 10/1999 | Hooker et al. ............... | 156/64 |
| 6,001,181 A | * | 12/1999 | Bullen ........................ | 118/679 |

* cited by examiner

Primary Examiner—Chris Fiorilla
Assistant Examiner—Yewebdar Tadesse
(74) Attorney, Agent, or Firm—Akerman Senterfitt; Stephan A. Pendorf

(57) ABSTRACT

The invention relates to an adhesive robot, comprising a device for applying adhesive to a workpiece. The adhesive robot has a nozzle head (18), which has an application nozzle (24) and can be supplied with a pressurized viscous adhesive, the nozzle head (18) and the workpiece (14) being displaceable in relation to one another. The adhesive which is issued from the application nozzle (24) in a spray jet (28) is applied to a workpiece (14) along a predefined line of application (36) in the form of a strip of adhesive (40). To facilitate the adjustment and re-calibration process, the system comprises at least one camera unit (42), which is located on the nozzle head (18) and whose leans is directed towards the spray jet (28) or the adhesive strip (40). The output of said camera unit is connected to an image evaluation unit (45). The image data (40) recorded by the camera unit (42) is buffered and compared with predetermined image values (40). The decisive control parameters for the system can be calibrated and tracked either automatically or by remote control, on the basis of deviations in the image data that have been determined along the line of application (36).

10 Claims, 3 Drawing Sheets

DEVICE FOR APPLYING ADHESIVE TO A WORKPIECE

CROSS REFERENCE TO RELATED APPLICATION

This application is a national stage of PCT/EP01/08965 filed Aug. 2, 2001 and based upon DE 100 48 749.1 filed Sep. 29, 2000 under the International Convention.

BACKGROUND OF THE INVENTION

1. Field of the Invention

The invention concerns a device for applying adhesive to a workpiece, the device including a nozzle head that can be supplied with viscous adhesive under pressure and an application nozzle, wherein the nozzle head and the workpiece are moveable relative to each other via robotic means, such that the adhesive emitted from the application nozzle, preferably in the manner of a spray jet, is applied to the workpiece in the form of an adhesive strip along a predefined line of application. In the following the term "adhesive" is intended to include other viscous materials, such as insulation, which can be applied to a workpiece in viscous form via an application nozzle.

2. Description of the Related Art

In the application of adhesives it is known to apply a viscous adhesive, with or without air manipulation, onto the workpiece in the form of an adhesive strip along an application line. It is further known to deflect and swirl a thread of adhesive emitted from an application nozzle according to the whirlwind principle with the aid of compressed gas and in this manner to apply upon the workpiece a strip-like, partially open, strip of material of defined breadth (EP 0576498 B1). With this type of application it has also been taken into consideration, the recognition that depending upon the viscosity or stiffness of the adhesive material, a more or less viscous or tenacious adhesive thread is emitted, even though the flow amount of material out of the application nozzle of the nozzle head remains the same and that, one on the other hand, depending upon the viscosity or tenacity of this thread, a greater or lesser gas stream is required in order to deflect the thread in predefined manner and to produce a defined strip breadth. For this, a parameter which depends upon the viscosity of the pasty material is measured, and the amount of compressed gas supplied for the time interval is so controlled in functional dependence upon the measured viscosity parameter, such that a material strip of constant breadth is sprayed along the workpiece. As viscosity dependent parameter one could consider the extrusion pressure of the material, the temperature of the pasty material and the drive pressure or, as the case may be, the drive output of a dispensing or dosing device for the pasty material. In the case that the compressed gas supply is made viscosity dependent, this involves a control technical measure which requires a substantial calibration effort. Above all in the case of the change of application parameters, in the case of changing the robot program or in the case of changing the adhesive or the workpiece surface, recalibrations are necessary, which can be quite time consuming.

SUMMARY OF THE INVENTION

Beginning therewith it is the task of the invention to improve the known devices of the above-described type in such a manner that the calibration process is automated during adhesive application and/or can be carried out via remote control.

The solution of this task is proposed in accordance with the combination of characteristics set forth in Claims 1 and 6. Advantageous embodiments and further developments of the invention can be seen from the dependent claims.

The inventive solution is based upon the idea, that the adhesive strip can be observed optically or can be scanned in the manner of a distance profile immediately after its application upon the workpiece, in order in the case of unacceptable deviations from a reference image or reference profile to initiate a recalibration. In order to accomplish this, it is proposed in accordance with the invention to provide at least one camera unit, preferably a video camera or thermal (infrared) camera, on the nozzle head or on the associated robotic element, with its lens directed towards the spray beam or the adhesive strip, the camera output connected to an image evaluation unit. In order to maintain the illumination as constant as possible, it is advantageous to provide a lighting or illumination unit on the nozzle head or on the associated robotic element.

A further alternative or advantageous embodiment of the invention envisions the provision of a distance sensor on the nozzle head or on an associated robotic element, directed towards the workpiece and scanning the application line for determining the distance from the nozzle head to the workpiece or the thickness profile of the adhesive strip.

The camera unit can be for example a line camera of which the image recording cells are oriented perpendicularly or diagonally to the application line. Preferred as the camera unit is however a CCD-camera which produces in rapid sequence two dimensional frames which can be digitally recorded and evaluated.

A preferred embodiment of the invention envisions that the image evaluation unit includes an actual-value memory for continuous recording of the measured image data as well as a path or clock time provider that can be synchronized with the actual-value memory along the line of application. The image evaluation unit preferably includes a distance or location provider which is self-calibrating at predetermined calibration positions along the workpiece. These calibration positions or locations could be either structural elements of the workpiece, such as interruptions, edges or overlap locations, or a calibration mark or calibration scale provided upon the workpiece especially for this self-calibration.

According to a further preferred embodiment of the invention the image evaluation unit includes an intended-value memory or generator for generation of predetermined image data along the application line. The intended-value image data could be generated for example using a master workpiece (template) during a teaching run. Finally, the image evaluation unit preferably includes a comparison circuit or routine for comparing the actual and intended values of at least a portion of the image data along the application line, of which the differential output could be a component of a control loop for the subsequent carrying out of the dispensing (application amount) and path parameters. For this purpose the dispensing head can be supplied with adhesive via a dispensing or dosing device, while the image evaluation unit and/or the distance sensor component are a component of the dosing or dispensing device controlling control loop.

The dispensing device preferably includes a dispensed-amount controller for controlling the amount of adhesive as well as an actuator or control device for adjusting the strip-breadth of the adhesive along the application line. The dispensing controller could include a piston pump with a piston stroke or position sensor, of which the drive pressure or drive force is variable with at least temporarily constant nozzle-opening cross-section. A preferred embodiment of the invention envisions that the nozzle head is a cyclonic spray head, of which the application nozzle is designed for emission of a coherent adhesive thread and which includes an air spray nozzle oriented diagonal to the direction of emission of the adhesive thread. In addition, there is provided a control device for adjusting the supply of spray air depending upon the predetermined or intended strip breadth along the application line, which can however be influenced by a tracking or compensating signal output of the image evaluation unit, extracted as a deviation or differential between the measured and the predetermined strip breadth. Alternatively, the nozzle head can be a cyclonic spray head, of which the application nozzle is designed for emission of a coherent adhesive thread and can be driven for rotation about an eccentric axis. Here also there is provided in addition a control device for adjusting the nozzle rotational speed according to the given dimensions of the strip breadth along the application line, which can be influenced by the tracking or compensating signal derived from an image evaluation unit generated deviation or differential between the measured and the predetermined strip breadth. In both alternatives the control unit can be influenced on the input side using control parameters for adjusting the spray air supply or the nozzle rotation speed, which can be derived from predetermined or measured adhesive amount per unit of time or a viscosity dependent value or magnitude. The viscosity dependent value can therein be proportional to the instantaneous drive pressure of a piston-pump type dosing or dispensing device.

A further preferred embodiment of the invention envisions that the robotic device includes an application line or path curve memory or generator for providing the path or the speed of the nozzle head along the application line.

Preferably the image evaluation unit is comprised of a control computer and image evaluation software. The image evaluation unit or the control computer could preferably be networked with an external computer via an online network. The external computer could on the other hand be networked, preferably via the online network, with the control unit. By this means an online monitoring of the adhesive robot as well as the adaptation of the actuation and control parameters becomes possible from an external monitoring location such as, for example, using the internet. The seamless and continuous image presentation makes possible besides this a rapid defect recognition and correction.

BRIEF DESCRIPTION OF THE DRAWINGS

In the following the invention will be described in greater detail on the basis of the illustrative embodiment shown in the figures. There is shown.

DETAILED DESCRIPTION OF THE INVENTION

Figure 1:
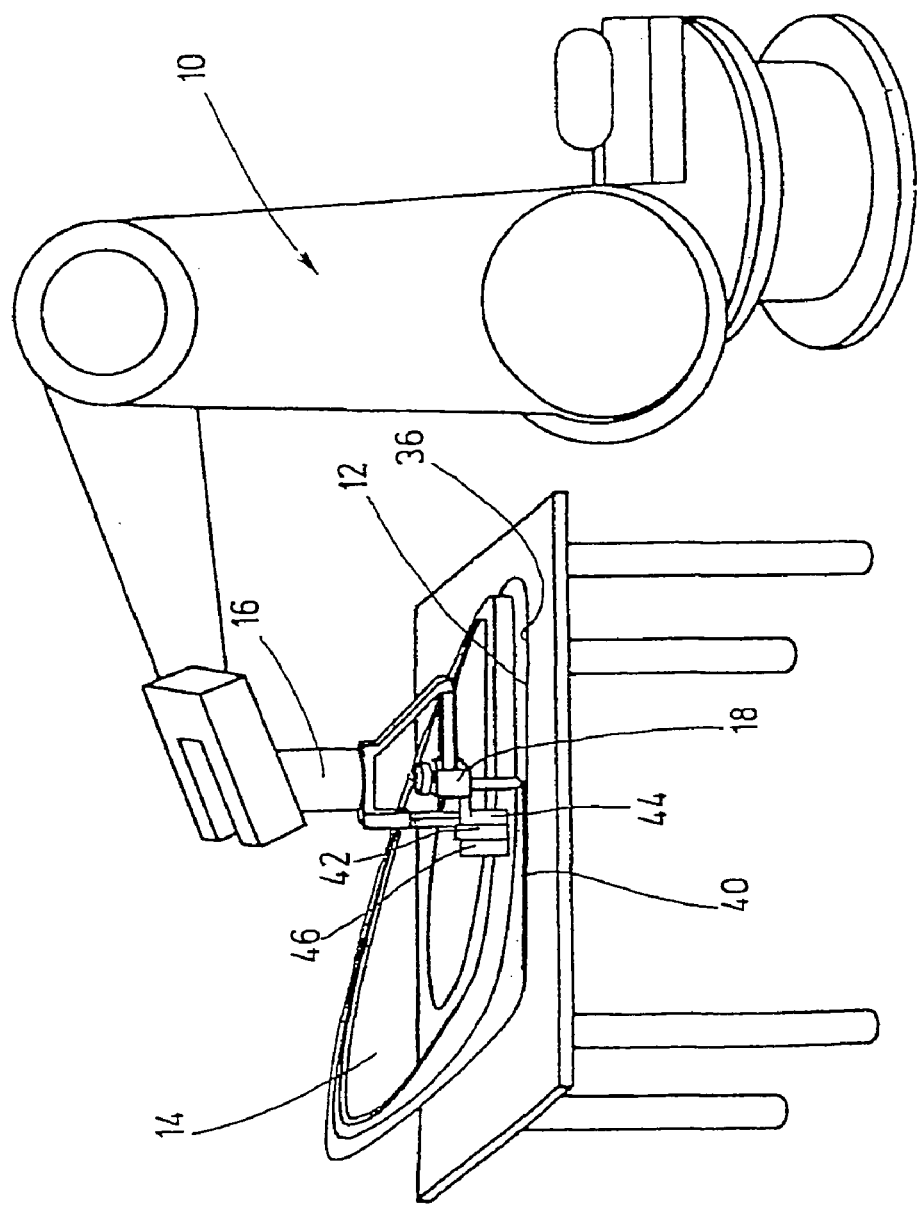
FIG. 1 a robot for the flange or edge-bead sealing of a workpiece in perspective representation.
Figure 2A:
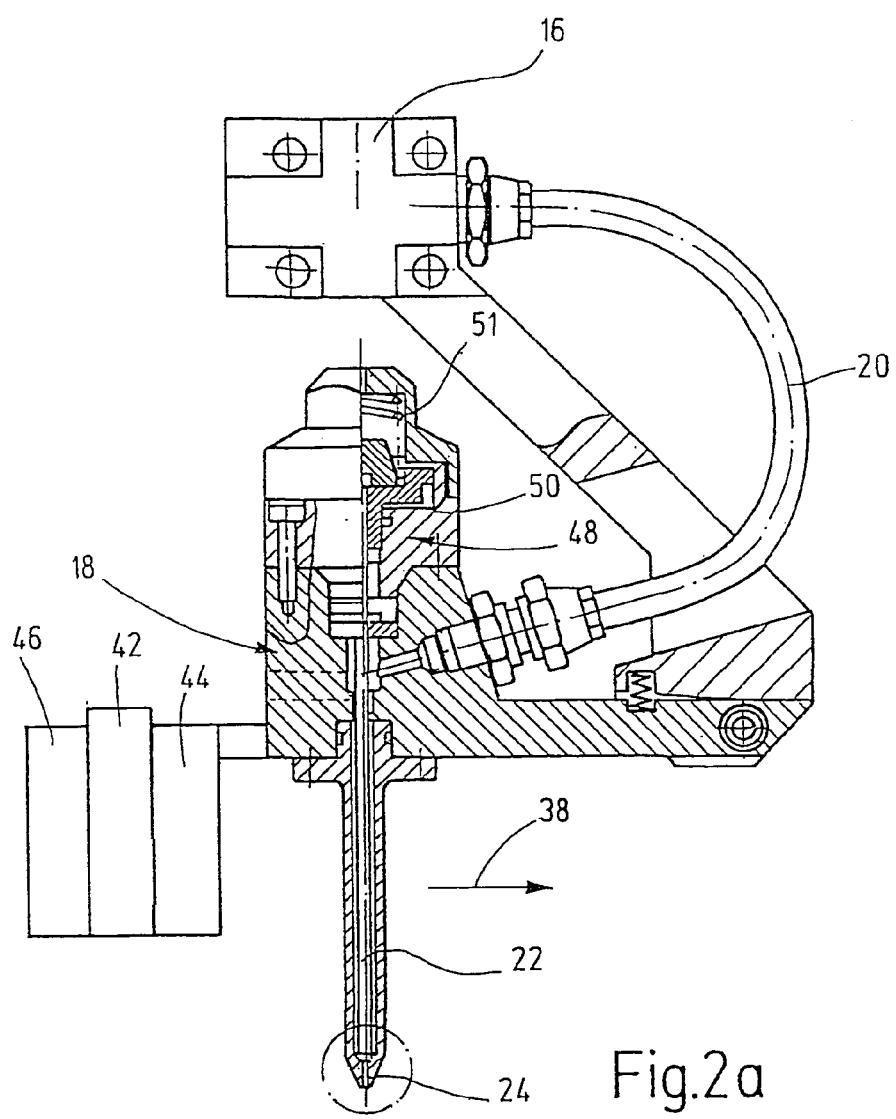
FIG. 2a a section through a nozzle head connected to an end element of the robot.
Figure 2B:
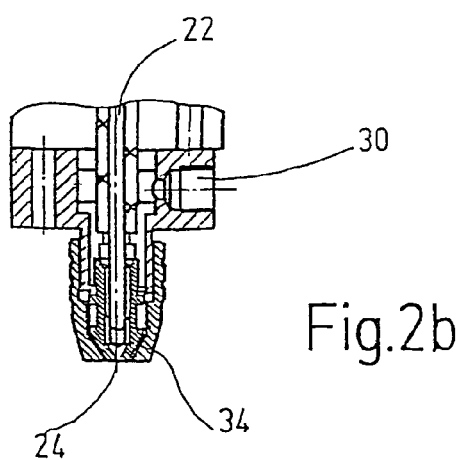
FIG. 2b an enlarged section according to FIG. 2a in the area of the application nozzle.

The robot 10 shown in the figure is designed for application of adhesive for sealing of edge beads or flange welds 12 of workpieces 14, here parts for passenger vehicles. The robot carries for this purpose on its end element 16 a nozzle head 18, which is supplied with a pasty adhesive via a flexible hose 20 and includes an application nozzle 24 closeable via a valve needle 22. The actuation of the valve needle 22 occurs via a cylinder-piston arrangement 48, of which the piston 50, when in the open position, is slid upward pneumatically by the robot control against the force of a closing spring 51, and in the closed position is slid downward under the influence of the closing spring 51. In the shown embodiment the nozzle head 18 is a cyclone spray head, wherein the adhesive thread 28 is emitted out of the application nozzle 24, which thread is deflected and whirled with the aid of pressurized gas, such that a strip-like laid-down partially open adhesive strip 40 of defined breadth is applied upon the workpiece 14. For this purpose the nozzle head 18 includes a spray air connection 30, to which a spray airline is connected. The spray air supplied thereby communicates with an air emission channel 34 oriented diagonal to the application nozzle 24.

The nozzle head is moveable via the robot 10 relative to the workpiece 14 along a predetermined application line 36 in the direction of the arrow 38 and applies upon the workpiece 14 a whirled adhesive strip 40 via the application nozzle 24.

Figure 3:
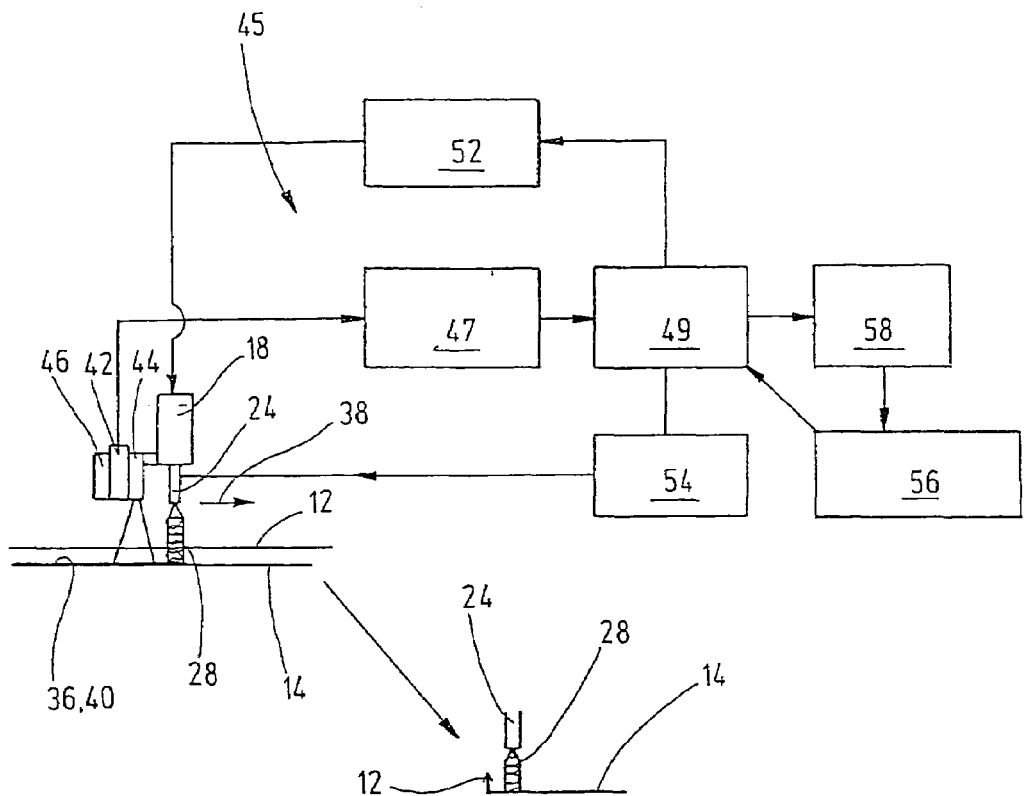
FIG. 3 a schematic diagram of a control device for controlling the nozzle head for the robotic device according to FIG. 1.
Figure 4:
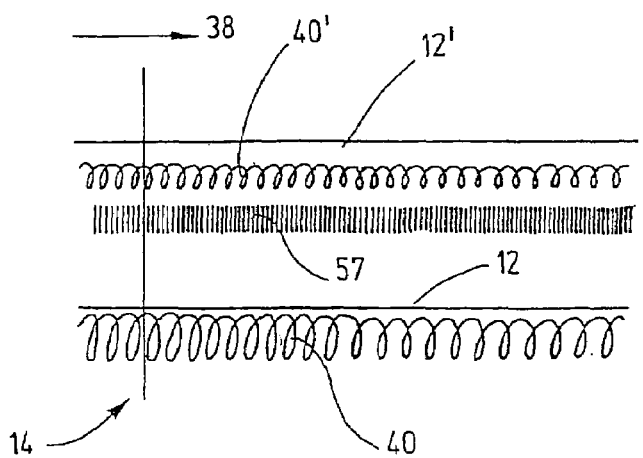
FIG. 4 a schematic for explaining the intended/actual value comparison in the control device according to FIG. 3.

As can be seen from FIGS. 1 and 3, on the end element 16 of the robot 10 there is additionally provided a camera unit 42 with illumination device 44, which is located aft of the nozzle head 18 in the direction of movement 38, and which has the task of monitoring the application of the adhesive strip 40 and, as necessary, to correct it using image evaluation unit 45 actuation or control technology.

In addition to the camera unit 42 a distance sensor 46 is coupled with the nozzle head 18, with which the distance of the application nozzle 24 to the workpiece 14 is detected as an important adjustment parameter, and the thickness profile and/or the breadth of the adhesive strip 40 can be determined. The distance sensor 46 carries out therein, in the manner of a scanner, a pendulum movement running transverse to the application track. The distance sensor 46 is, for example, a laser sensor or an ultrasound sensor.

The measurement data from the camera unit 42 and the distance sensor 46 are input into an image data memory 47 for the determination of the actual data 40, and compared in a computer 49 at least partially via a comparison routine with predetermined intended data 40'. There can be measured, for example, the distance to the flange weld bead edge 12, 12', and the breadth and the thickness of the adhesive strip 40. The comparison data can thereby be converted to control parameters for the control of the dispenser 52 or the spray air supply 54. The control parameters take into consideration the speed of advance of the nozzle head 18, the drive pressure of the dispenser 52, the spray air pressure in the spray air supply 54 or the distance of the application nozzle 24 from the workpiece 14. Due to the high application speed a very rapid camera 42 is necessary. Likewise desirable is a good and constant illumination via the illumination unit 44. Preferably each individual camera image is illuminated using a flash bulb or an illumination unit 44 in the form of a diode flash. The path measurement or navigation along the application track 36 occurs preferably via a path provider or a path scale 57, which can be adjusted or interpolated using reference points fixed on the workpiece, such as reference boreholes, kinks, breaks or interruptions. In this way even the predetermined application path 36 can be appropriately corrected as necessary via the robot control according to the measured values.

The monitoring of the adhesive strip with the rapid video camera 42 and the distance sensor 46 simplifies both the adjustability of the robot 10 and the dispensing system 52, 54 as well as their resetting following disruptions, such as changing of material, temperature oscillations or intervention in the original set parameters. It is of particular advantage herein that the setting and correction processes can be carried out also using external computers 56, for example from a service station, with use of an online network 58, such as the internet.

In summary the following can be concluded: The invention relates to an adhesive robot, comprising a device for applying adhesive to a workpiece. The adhesive robot has a nozzle head 18, which has an application nozzle 24 and can be supplied with a pressurized viscous adhesive, the nozzle head 18 and the workpiece 14 being displaceable in relation to one another. The adhesive, which is issued from the application nozzle 24 in a spray jet 28, is applied to a workpiece 14 along a predefined line of application 36 in the form of a strip of adhesive 40. To facilitate the adjustment and re-calibration process, the system comprises at least one camera unit 42, which is located on the nozzle head 18 and whose lens is directed towards the spray jet 28 or the adhesive strip 40. The output of said camera unit is connected to an image evaluation unit 45. The image data 40 recorded by the camera unit 42 is buffered and compared with predetermined image values 40. The decisive control parameters for the system can be calibrated and tracked either automatically or by remote control, on the basis of deviations in the image data that have been determined along the line of application 36.

The invention claimed is:

1. A device for applying adhesive to a workpiece, comprising a nozzle head (18), which has an application nozzle (24) and can be supplied with a pressurized viscous adhesive, wherein the nozzle head (18) and the workpiece (14) are displaceable in relation to one another via robotic means (10) such that the adhesive, which is issued from the application nozzle (24), preferably as a spray jet (28), is applied to a workpiece (14) along a predefined line of application (36) in the form of a strip of adhesive (40), and wherein at least one camera unit (42), which is located on the nozzle head (18) or an associated robotic element, with lens directed towards the spray jet (28) or the adhesive strip (40), of which the output of said camera unit is connected to an image evaluation unit (45), wherein the image evaluation unit (45) includes an actual value memory (47) for continuous storage of the measured image data (40) as well as an impulse clock or a provider of position (57) along the application line (36) synchronizable with the actual value memory, and wherein the nozzle head (18) is a cyclone spray head, of which the application nozzle (24) is for emission of a coherent adhesive thread (28) and is drivable for rotating about an eccentric axis, and that a control device is provided for adjusting the nozzle rotation speed according to the value of the predetermined strip breadth along the application line (36), which can be acted upon by a tracking or adjusting signal derived from the image evaluation unit (45), determined by the deviation of the measured image data from the predetermined strip breadth.

2. A device according to claim 1, wherein the image evaluation unit includes an intended value memory or generator for generating predetermined image data (40') along the application line (36).

3. A device according to claim 2, wherein it is adapted to generate the intended value image data (40') in a teaching run.

4. A device according to claim 1, wherein the image evaluation unit (45) includes a comparison circuit or routine for comparing the actual/intended values of at least a portion of the image data (40, 40') along the application line (36).

5. A device according to claim 1, wherein the nozzle head (18) is supplied with adhesive via a dispensing device (52), and that the image evaluation unit (45) and/or the distance sensor (46) are components of the control loop driving the dispensing device (52, 54).

6. A device according to claim 5, wherein the dispensing device includes a volume control for adjusting the adhesive material flow as well as an actuation or control device (54) for adjusting the strip breadth of the adhesive along the application line (36).

7. A device according to claim 6, wherein the robot (10) includes a navigator or a path curve memory or generator for adjusting the path and the speed of the nozzle head (18) along the predetermined application line (36).

8. A device according to claim 6, wherein the flow controller includes a piston pump with a piston stroke measuring device, of which the drive pressure or force is variable in the case of an at least temporarily constant application-nozzle opening cross-section.

9. A device according to claim 1, wherein the nozzle head (18) is supplied wit adhesive via a pressure control (52) and that the image evaluation unit (45) and/or the distance sensor (46) are components of the control loop driving the pressure control (52, 54).

10. A device according to claim 1, wherein the nozzle head (18) is a cyclone spray head, of which the application nozzle is adapted for output of a coherent adhesive thread (28), and which includes at least one spray air channel (34) oriented diagonal to the application nozzle (24), and that a control unit (54) is provided for setting the spray air supply according to the value of the predetermined strip breadth along the application line (36), which can be acted upon by a tracking or adjusting signal derived from the image evaluation unit (45), determined by the deviation of the measured image data from the predetermined strip breadth.

* * * * *